United States Patent
Hall

(10) Patent No.: US 7,537,107 B2
(45) Date of Patent: May 26, 2009

(54) EXTERNAL DIRECT DRIVE FOR A ROLLER CONVEYOR

(75) Inventor: David V. Hall, Cookeville, TN (US)

(73) Assignee: Milwaukee Electronics Corporation, Milwaukee, WI (US)

( * ) Notice: Subject to any disclaimer, the term of this patent is extended or adjusted under 35 U.S.C. 154(b) by 0 days.

(21) Appl. No.: 11/938,420

(22) Filed: Nov. 12, 2007

(65) Prior Publication Data

US 2008/0116041 A1    May 22, 2008

Related U.S. Application Data

(60) Provisional application No. 60/866,289, filed on Nov. 17, 2006.

(51) Int. Cl.
*B65G 13/06* (2006.01)
(52) U.S. Cl. .............. 198/781.1; 198/781.03; 198/790
(58) Field of Classification Search ............. 198/781.1, 198/781.03, 781.09, 790
See application file for complete search history.

(56) References Cited

U.S. PATENT DOCUMENTS

| | | | | |
|---|---|---|---|---|
| 3,960,262 | A | * | 6/1976 | Henig .................... 198/572 |
| 4,164,998 | A | * | 8/1979 | DeGood et al. ........ 198/781.06 |
| 4,196,312 | A | * | 4/1980 | DeGood et al. ........ 198/781.1 |
| 4,349,100 | A | * | 9/1982 | McLean ................. 198/783 |
| 4,832,184 | A | * | 5/1989 | DeGood ................ 198/781.03 |
| 5,224,584 | A | | 7/1993 | Best et al. |
| 6,035,999 | A | | 3/2000 | Hall |
| 6,412,623 | B2 | * | 7/2002 | Axmann et al. ........ 198/791 |
| 6,516,940 | B1 | * | 2/2003 | Hart et al. ............. 198/781.1 |
| 6,772,874 | B2 | * | 8/2004 | Yamashita et al. ..... 198/781.03 |

FOREIGN PATENT DOCUMENTS

DE    2336347    10/1999
EP    0505206    9/1992

* cited by examiner

*Primary Examiner*—James R Bidwell
(74) *Attorney, Agent, or Firm*—Boyle Fredrickson, S.C.

(57) ABSTRACT

A conveyor that is powered by a drive unit is disclosed. The conveyor includes a frame, and the drive unit includes a gearless external drive motor that is configured to fit within the footprint defined by the conveyor frame. The conveyor includes a series of conveying members, such as rollers, that are rotatably supported by the frame. The motor includes an output member that is engaged with a driven one of the rollers, and the driven roller is mechanically linked to an adjacent one of the rollers so that the adjacent roller is driven into rotation in response to rotation of the driven roller. The conveyor is constructed as a conveyor section or zone, which is adapted to be used with a series of similarly constructed conveyor sections or zones to form an overall conveyor system.

19 Claims, 5 Drawing Sheets

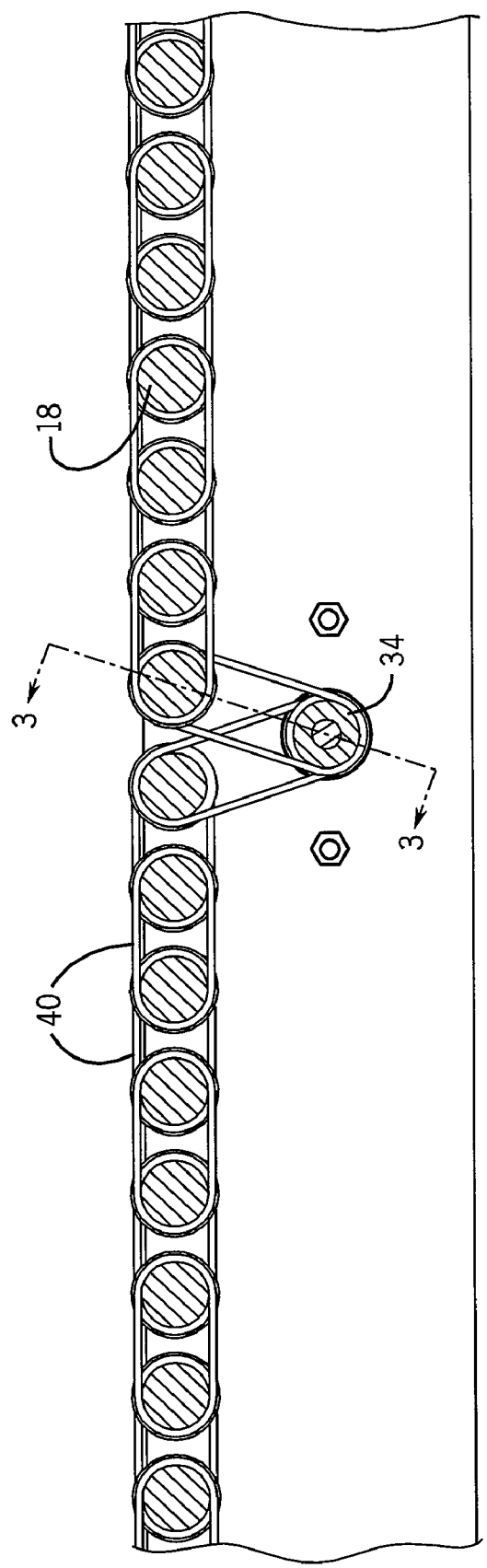

EXTERNAL DIRECT DRIVE FOR A ROLLER CONVEYOR

CROSS-REFERENCE TO RELATED APPLICATION

This application claims priority from U.S. Provisional Application Ser. No. 60/866,289, filed on Nov. 17, 2006.

BACKGROUND

This invention relates generally to a system and device for conveying. More specifically, the invention relates to a unit handling roller conveyor system driven by an external direct current ("DC") motor.

Unit handling roller conveyor systems generally comprise sections, or zones, made up of conveyor frames supporting individual rollers. The rollers of each zone are driven by a motor, and transport items from one end of the zone to the other. Each zone may have separate controls, and the zones and associated controls are connected with other zones to form a larger conveying system. In recent years, several advancements have been made to roller conveyor systems. For example, the development of low voltage DC motorized drive rollers (MDRs) have resulted in reduced power consumption, decreased noise and fewer maintenance requirements. Another advancement involves the use of elastomeric o-ring type belts that are used with the MDRs, function to drive the idler rollers in each zone in response to rotation of an MDR.

Despite these advancements, motorized rollers are not without some limitations and drawbacks. A typical commercially available motorized roller has support bearings, a motor, a gear reducer and an internal drive mechanism axially stacked within a casing. Because of this stacking, the minimum overall length of commercially available motorized rollers is in the range of 11", thereby preventing use of motorized rollers in very narrow conveyors. Further, the minimum diameter of commercially viable motorized rollers is approximately 1.9" which precludes the use of motorized rollers in conveyor designs for small packages. Furthermore, reliability is an ongoing issue because motorized rollers are only rated for about two years of continuous use due to gear failure.

Therefore, there is a need for an externally mounted, compact, direct drive, low voltage and reliable DC motor to drive the rollers of a conveyor system. There is also a need for the drive motor to fit within the footprint of the section of roller conveyor. There is further a need for a roller conveyor system having significant reductions in power consumption, noise generation and maintenance requirements, as well as a need for a roller conveyor system that permits shorter, smaller diameter rollers, higher efficiency, and more robust lead assemblies.

SUMMARY OF THE INVENTION

The present invention is directed to a conveyor assembly. In one embodiment, the conveyor assembly includes a series of rollers and a frame supporting the rollers. The conveyor assembly further has a drive unit, which may include a motor having a shaft, a drive member such as a sheave mounted to the shaft, and at least one transmission component, such as a belt, engaged with the drive member. The at least one belt links the sheave to at least one roller so as to drive the at least one roller when the sheave is rotated by the shaft in response to operation of the motor.

In accordance with another aspect, the invention contemplates a conveyor assembly that includes a frame and a series of conveying members rotatably supported by the frame. The conveyor assembly further has a motor interconnected with the frame, and the motor may include an output member operably engaged with at least one of the conveying members to impart rotation to the conveying member in response to operation of the motor. The motor output member imparts rotation to the conveying member without the use of a gearbox between the motor output member and the conveying member.

In accordance with yet another aspect, the present invention contemplates a conveyor assembly that includes a frame defining a cross section that includes a recess, and a series of conveying members rotatably supported by the frame. The conveyor assembly further has a motor interconnected with the frame, and the motor includes an output member operably engaged with at least one of the conveying members to impart rotation to the conveying member in response to operation of the motor. The motor includes a housing, and is secured to the frame within the recess.

In accordance with a still further aspect, the present invention contemplates a method of constructing a conveyor assembly having a series of rollers, a frame supporting the rollers, and a drive unit. The drive unit may include a motor having a shaft, a sheave mounted to the shaft, and at least one belt, wherein the at least one belt links the sheave to at least one roller so as to drive the at least one roller when the sheave is rotated by the shaft in response to operation of the motor. The method may further include the step of rotating the shaft of the motor to drive the at least one roller, and the roller is operable to move items supported on the conveyor assembly.

These, and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

The drawings illustrate the best mode presently contemplated of carrying out the invention. In the drawings:

FIG. 5 is a longitudinal cross section view of the roller conveyor assembly section of FIGS. 1-3.

DETAILED DESCRIPTION OF THE INVENTION

Figure 1:
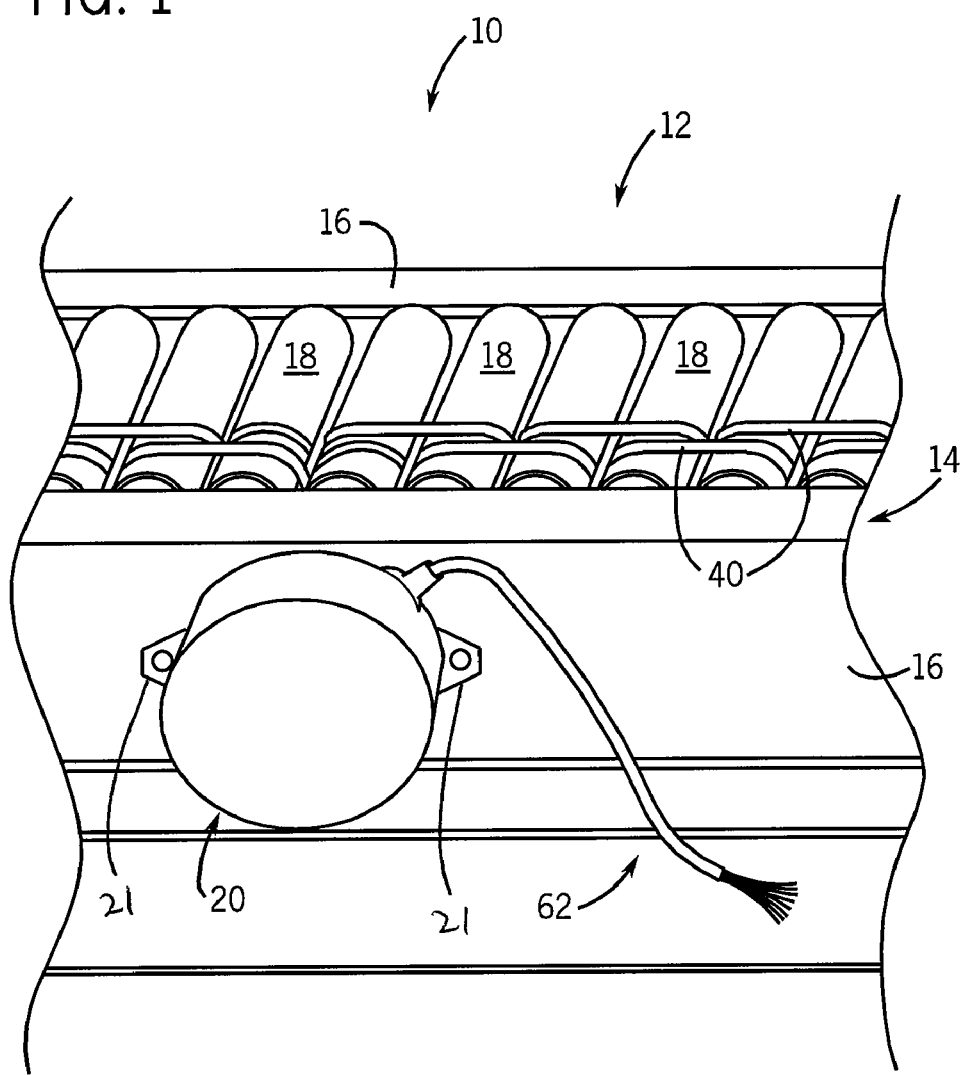
FIG. 1 is an upper perspective view of a section of the roller conveyor assembly of the present invention.

FIGS. 1-5 disclose one embodiment of a roller conveyor assembly 10 in accordance with the invention. The conveyor assembly 10 generally makes up a section, or zone, 12 of an overall roller conveyor system incorporating a large number of similarly constructed sections or zones. Each section 12 is formed of a conveyor frame 14 having a pair of spaced apart structural members 16 with a series of rollers 18 disposed between the structural members 16. In the illustrated embodiment, the structural members 16 are in the form of C-shaped channel members, although it is understood that any other satisfactory shape or type of structural member may be employed. The rollers 18 are rotatably supported by and between structural members 16 as is well known in the art.

As shown in FIG. 1, the roller conveyor assembly 10 includes an external drive motor 20 mounted to the frame 14. The motor 20 has a large diameter and a short axial length, which enables the motor 20 to fit within the footprint of the structural member 16. In the embodiment shown, the frame 14 can accommodate a motor up to 4⅝" diameter and 1½" axial length. The motor 20 preferably is a low voltage (i.e., approximately 24V or less), brushless, DC motor, such as is available from Automation Controls Group, an MEC Company of Milwaukee, Wis. under its model no. 109096. It is understood, however, that any other satisfactory short, flat "pancake" type motor may be employed. The motor 20 is mounted to the frame 14 near the middle of the section of conveyor 12. Representatively, the motor 20 may include a pair of mounting ears 21, which are adapted for placement against the web of the structural member 16. A bearing housing 22 and shaft 24 extend through the frame 14 beneath the rollers 18. Two ball bearings 26 may be used to provide load support to the shaft 24 relative to the frame 14. Preferably, the ball bearings 26 are much larger than ball bearings used in the prior art motorized rollers. In one embodiment, the bearings are rated at 1,000,000 revolutions at 906 lbs. load. Two mounting bolts 28, split washers 30 and nuts 32 secure the motor 20 to the frame 14 using the mounting ears 21. Additionally, the shaft 24 may be configured for use in conjunction with a Woodruff Key, as is known in the art.

Figure 2:
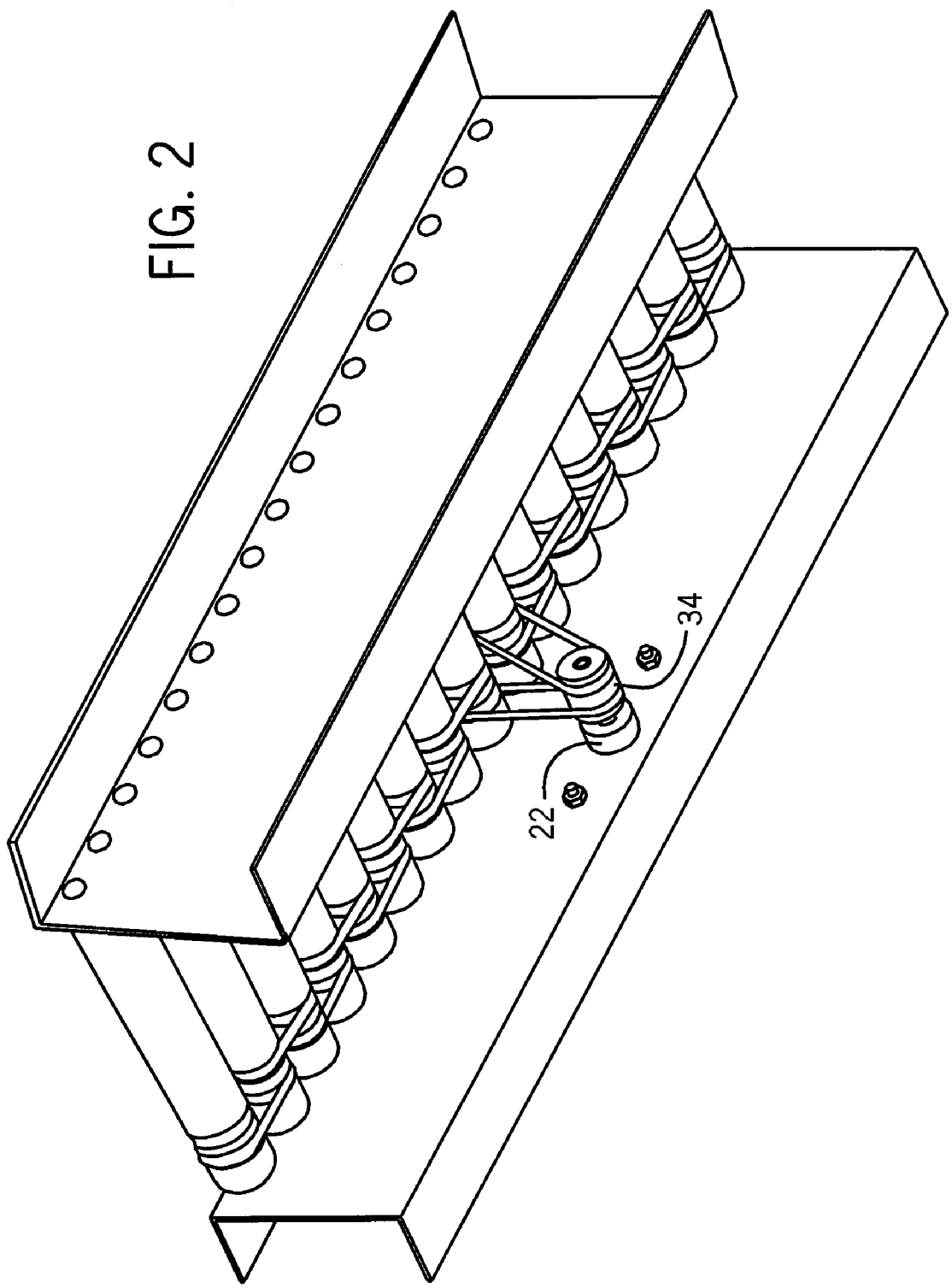
FIG. 2 is a lower perspective view of the roller conveyor assembly section shown in FIG. 1.
Figure 3:
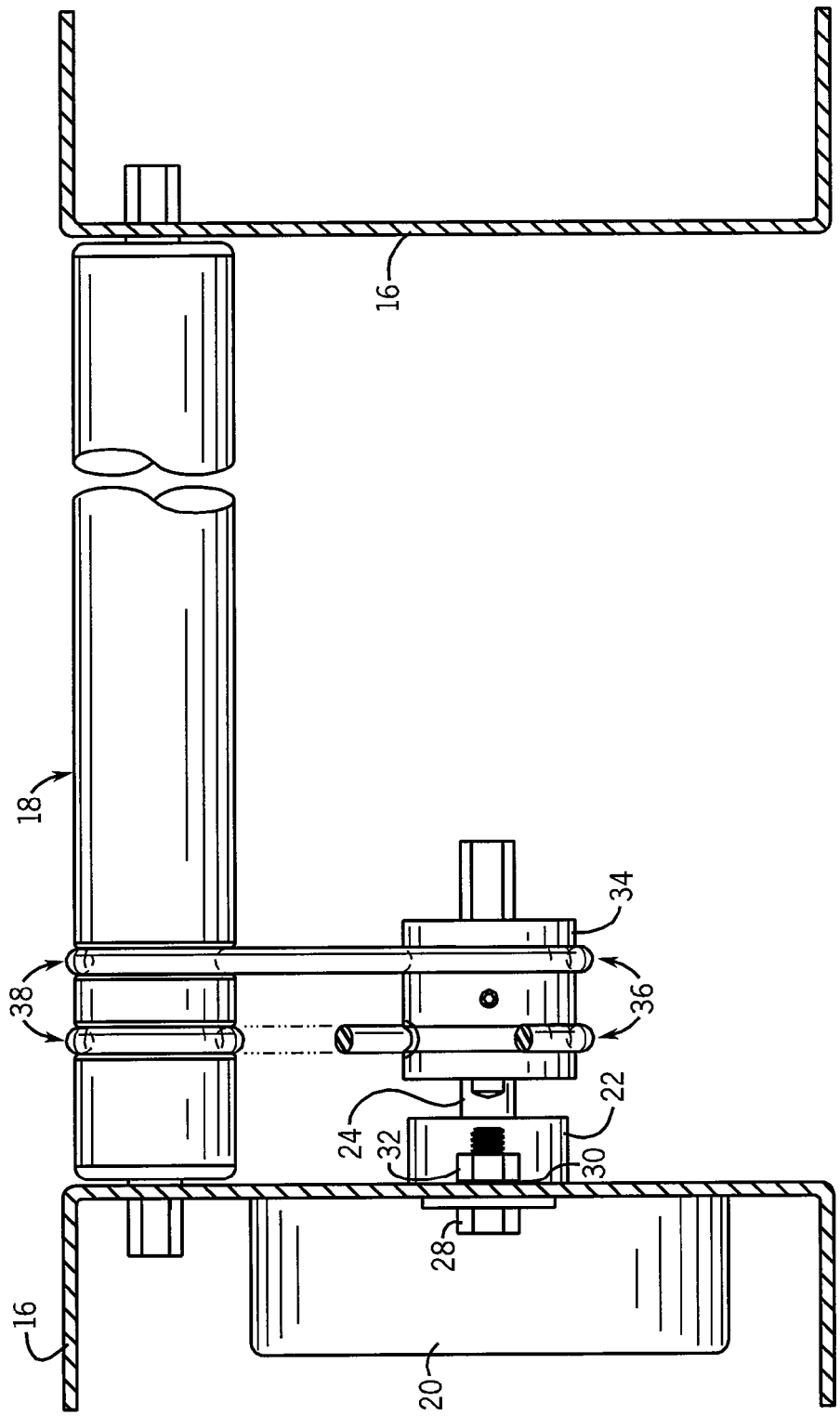
FIG. 3 a transverse cross-sectional view of the roller conveyor assembly section shown in FIGS. 1 and 2.

An output member, which may be in the form of a sheave 34, or alternatively a pulley or sprocket, is affixed to the shaft 24 of the motor 20. Grooves 36 in the sheave 34 are designed to match grooves 38 in the rollers 18. The diameter of the sheave 34 is dependent on the desired operating speed of the rollers 18. Elastomeric drive belts 40 are engaged within the grooves 38, and drivingly connect the sheave 34 to an adjacent pair of rollers 18. Similar drive belts 40 function to drivingly connect each roller 18 to the adjacent rollers 18. Elastomeric drive belts 40 may be formed of a urethane material, although it is understood that any other satisfactory material may be employed. As shown in FIGS. 1-2 and 5, the two drive belts 40 connected to sheave 34 and to the two driven rollers 18 form a "V" configuration. The two driven rollers 18 are driven through rotation of the sheave 34 by the motor 20, which in turn drives the adjacent rollers 18. The use of the specially designed sheaves 34 and elastomeric drive belts 40 eliminates the need for a gearbox between the motor output and the driven rollers.

As an alternative to drive belts 40, it is understood that any other satisfactory flexible drive member may be employed for transferring rotation from the motor output member to the rollers 18. For example, the drive member may be in the form of a belt or chain, and the motor output member may be in the form of a pulley (in the case of a belt-type drive member) or a sprocket (in the case of a chain-type drive member). Rather than direct engagement with the driven rollers 18, each flexible drive member may be engaged with a pulley or sprocket that is mounted to the driven roller shaft.

The motor 20 is preferably designed to operate at relatively high torque (13 inch-pounds at full load) and relatively low speed (representatively, the motor 20 may be designed to operate at 275 RPM at full speed) without the need for speed reduction gearing. Noise reduction is achieved by the elimination of the gears typically associated with a gear drive, as well as operating at a reduced speed. The preferred motor 20 operates at a much higher electromechanical efficiency than a high-speed, small diameter motor due to the use of larger gauge wire in the windings and low eddy current losses in the motor 20. Additional improvements in efficiency result from elimination of frictional losses associated with gearing required with small, high speed motors.

Figure 4:
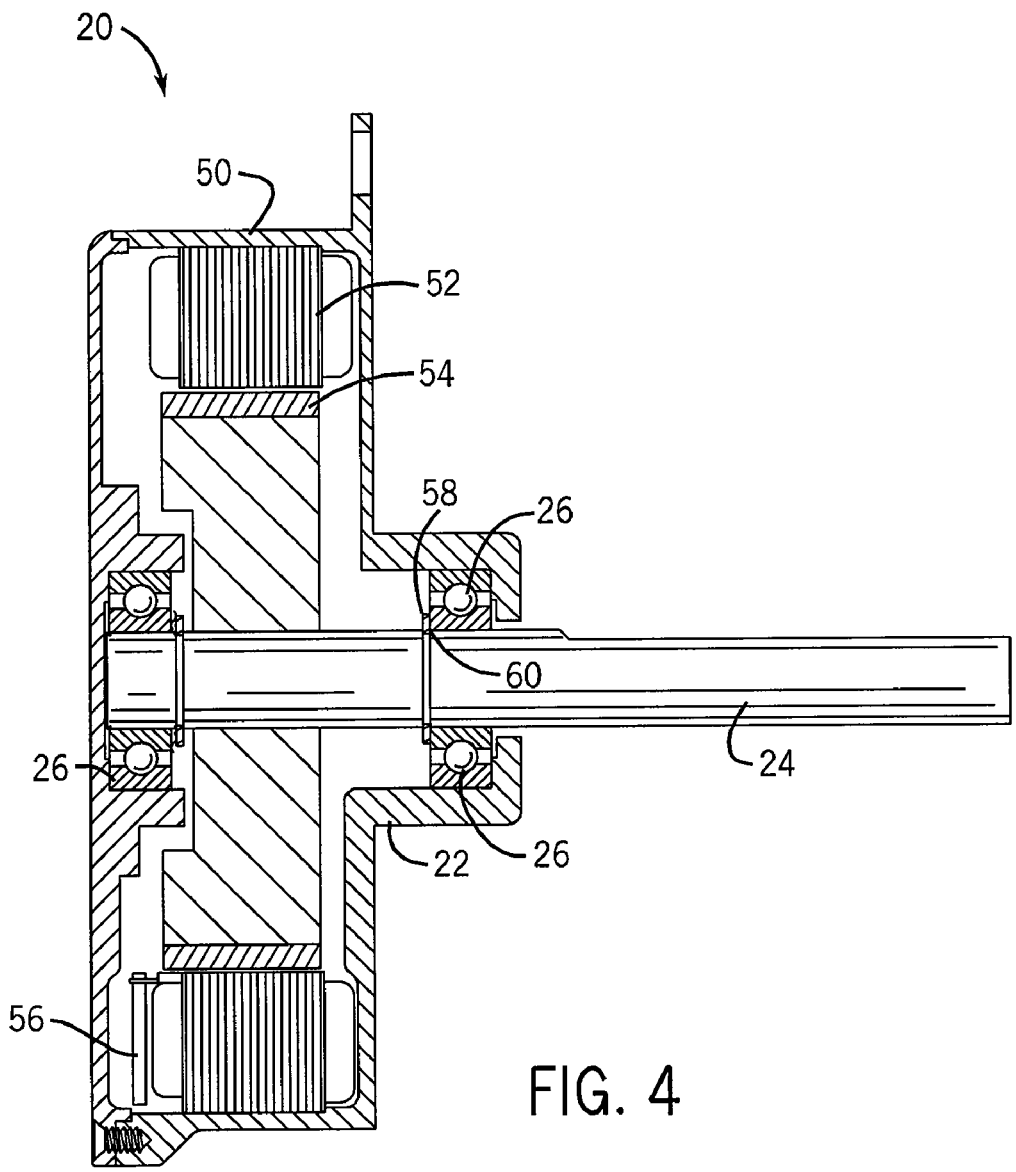
FIG. 4 is a cross-sectional view of the motor shown in FIGS. 1-3.

As shown in detail in FIG. 4, the motor 20 includes a housing 50, a stator 52, a rotor 54, output shaft 24 and heavy duty ball bearings 26 (as noted previously). Additional components of motor 20 include a printed circuit board 56 ("PCB") with three Hall effect sensors, snap rings 58 and wave washers 60. A dowel pin may be used to help assure the position of the Hall effect sensors. In one embodiment, the stator 52 has fifteen poles, laminated and three-phase windings while the rotor 54 has fourteen permanent magnet poles. The motor 20 is connected to a controller (not shown) via control wires 62 (FIG. 1). The control wires 62 may be housed by a single cable. Typically, the motor 20 is turned on and off in response to standard sensors (not shown), as is known in the art.

While the motor 20 has been described as including Hall effect sensors, it is also contemplated that the motor 20 may be constructed as a sensor-less motor in which the motor commutation is determined by the electronic components without using sensors, such as the Hall effect sensors as shown and described above.

Motor 20 is shown and described as having an internal rotor and an external stator. While this construction is satisfactory, it is also contemplated that the motor 20 may be constructed to have an internal stator and an external rotor, in a manner as is known. It is contemplated that motor 20 with an internal stator and external rotor may be somewhat simpler to manufacture in the winding process, and also that an internal stator/external rotor motor may deliver more torque than can be obtained in an internal rotor/external stator configuration.

Additionally, the motor 20 may include a rear shaft extension to allow for the addition of an external electro-mechanical brake, which may be used for sections of a conveyor assembly featuring an incline or a decline. For example, an electro-mechanical brake may be useful in the case of a power outage to the motor 20. Hall effect sensors may be used also be used for control of position-sensitive applications. Further, the motor 20 may include a one-way bearing, which may prevent the rollers from spinning backwards on an incline section of a conveyor assembly.

The combination of the external motor 20 designed with an adequate number of poles (not shown), electronically controlled speed and high torque allows the use of only two different diameter sheaves 34 to provide the performance range of as many as ten different motorized roller gear ratios. Further benefits accrue to both the conveyor OEM and to the end user because only one motor needs to be stocked for manufacturing or service replacement purposes. Motorized roller inventory requires a different part number for every speed, diameter, gear ratio and overall length, resulting in many variations for each sale or installation.

Further benefits of using an externally mounted motor 20 rather than motorized rollers include excellent heat transfer to the conveyor frame 14 due to the intimate contact of the motor housing 50 with frame 14, which reduces the likelihood of motor burnout. Also, the minimum width of conveyor rollers 18 can be reduced by as much as fifty percent or more over prior art motorized conveyor rollers as needed. The minimum diameter of the conveyor rollers 18 can be reduced to approximately ½ of the commercially available 1.9" diameter rollers, e.g., to about ⅞ inch, when close pitch is needed. Finally, mechanical losses in a gearbox (typically 5-10% per stage 12) are eliminated as are life expectancy issues related to gear wear.

Although a preferred embodiment of carrying out the present invention is disclosed above, practice of the present invention is not limited thereto. For example, it will be apparent that various additions, modifications and rearrangements of the features of the present invention may be made without deviating from the spirit and scope of the underlying inventive concept. In addition, the individual components need not be fabricated from the disclosed materials, but could be fabricated from virtually any suitable materials. Moreover, the individual components need not be formed in the disclosed shapes, or assembled in the disclosed configuration, but could be provided in virtually any shape, and assembled in virtually any configuration. Further, although many elements and components are described herein as physically separate modules, it will be apparent that they may be integrated into the apparatus with which it is associated.

Various alternatives are contemplated as being within the scope of the following claims particularly pointing out and distinctly claiming the subject matter regarded as the invention.

I claim:

1. A roller conveyor, comprising:
   a plurality of rollers;
   a frame including a pair of spaced apart frame members, wherein the rollers are rotatably mounted to and located between the frame members; and
   a drive unit, comprising a motor having a motor output shaft, wherein the motor is mounted to and supported by one of the frame members; a motor output member mounted to the motor output shaft, wherein the motor output member is vertically spaced from the rollers; and at least one flexible drive member, wherein the flexible drive member extends between and directly drivingly connects the motor output member with at least a driven one of the rollers so as to drive the driven roller when the output member is rotated by the motor output shaft in response to operation of the motor;
   wherein the driven roller is drivingly interconnected with the plurality of rollers such that rotation of the driven roller in response to operation of the drive unit is transferred to the plurality of rollers.

2. The roller conveyor of claim 1, wherein the driven roller includes a groove and is mechanically linked to at least one adjacent roller by engagement of a belt in the groove such that the adjacent roller is rotated in response to rotation of the driven roller.

3. The roller conveyor of claim 1, wherein the output member comprises a sheave having at least one groove, and wherein the flexible drive member comprises at least one drive belt engaged with the groove.

4. The roller conveyor of claim 3, wherein the driven roller has at least one groove to receive the at least one drive belt.

5. The roller conveyor of claim 4, wherein the motor is a low voltage DC motor.

6. The roller conveyor of claim 1, wherein the frame member includes a structural member defining an axially extending recess, and wherein the motor has a housing and is mounted to the structural member of the frame such that the housing is contained within the axially extending recess defined by the structural member.

7. The roller conveyor of claim 1, wherein each one of the plurality of rollers has a diameter between about ⅞ inch and about 2 inches.

8. A roller conveyor, comprising:
   a plurality of rollers;
   a frame supporting the rollers, wherein the frame includes a structural member defining an axially extending recess; and
   a drive unit, comprising a motor having a shaft, an output member mounted to the shaft, and at least one flexible drive member, wherein the flexible drive member links the output member to at least a driven one of the rollers so as to drive the driven roller when the output member is rotated by the shaft in response to operation of the motor, and wherein the motor has a housing and is mounted to the structural member of the frame such that the housing is contained within the axially extending recess defined by the structural member, wherein the driven roller is drivingly interconnected with the plurality of rollers such that rotation of the driven roller is transferred to the plurality of rollers;
   wherein the structural member of the frame includes an upright section that supports the plurality of rollers, and at least one laterally extending upper section that extends outwardly relative to the upright section and that defines in part the axially extending recess, and wherein the motor is mounted to the upright section of the structural member.

9. The roller conveyor of claim 8, wherein the roller conveyor forms a section or zone of an overall conveyor assembly formed of a plurality of similarly constructed roller conveyor sections or zones.

10. The roller conveyor of claim 8, wherein the frame is comprised of two C-shaped channel members, each of which includes an upright section and an upper and a lower laterally extending section.

11. A conveyor assembly, comprising:
    a frame including a pair of spaced apart frame members;
    a plurality of conveying members extending between and rotatably supported by the frame members; and
    a motor mounted to and supported by one of the frame members and including a motor output member, wherein the motor output member is vertically spaced from the conveying members, and wherein the motor output member is engaged with at least one of the conveying members via a flexible drive member that extends between and directly drivingly connects the motor output member with at least a driven one of the conveying members to impart rotation to the conveying member in response to operation of the motor, wherein the motor output member and the flexible drive member are configured and arranged to impart rotation to the conveying member without the use of gearing between the motor output member and the conveying member.

12. The conveyor assembly of claim 11, wherein the flexible drive member is engaged with a sheave secured to the motor output member.

13. The conveyor assembly of claim 12, wherein each one of the plurality of conveying members is a roller having a diameter between about ⅞ inch and about 2 inches.

14. A conveyor assembly, comprising:
    a frame including a pair of structural members, at least one of which defines a cross section that includes an outwardly facing recess;
    a plurality of conveying members rotatably supported by and between the structural members of the frame, wherein the conveying members extend inwardly of each frame member relative to the outwardly facing recess; and a motor interconnected with one of the frame members and including an output member, wherein the motor output member is vertically spaced from the conveying members, and wherein the motor output member is engaged with at least one of the conveying members via a flexible drive member that extends between and directly drivingly connects the motor output member with at least a driven one of the conveying members without the use of gearing between the motor output member and the conveying member to impart rotation to the conveying member in response to operation of the motor, wherein the motor includes a housing that is secured to the frame within the recess.

15. The conveyor assembly of claim 14, wherein the cross section of the frame member defines a footprint, and wherein the motor is configured such that the motor housing is fully contained within the footprint of the frame member.

16. The conveyor assembly of claim 14, wherein the motor further includes a bearing housing.

17. A conveyor assembly, comprising:
   a frame including a structural member defining a cross section that includes a recess;
   a plurality of conveying members rotatably supported by the structural member of the frame; and
   a motor interconnected with the frame and including an output member operably engaged with at least one of the conveying members to impart rotation to the conveying member in response to operation of the motor, wherein the motor includes a housing that is secured to the frame within the recess;
   wherein the structural member of the frame includes an upright section to which the motor is mounted, wherein the motor is secured against an outer surface defined by the upright section of the structural member, and wherein the output member is located inwardly of an inner surface defined by the upright section of the structural member at a location vertically spaced from the plurality of conveying members, and wherein the output member is operably engaged with at least one of the conveying members via a flexible drive member engaged between the output member and one of the conveying members.

18. A method of constructing a roller-type conveyor, comprising the acts of:
   providing a plurality of rollers;
   providing a frame including a pair of spaced apart frame members, and rotatably supporting the rollers between the frame members;
   providing a drive unit, comprising a motor having a shaft, an output member secured to the shaft, and at least one flexible drive member;
   mounting the motor to one of the frame members such that the motor output member is vertically spaced from the rollers; and
   engaging the flexible drive member directly with and between the motor output member and at least one of the rollers without the use of gearing between the motor output member and the at least one roller, wherein the at least one roller is driven when the motor output member is rotated by the shaft in response to operation of the motor without the use of gearing between the motor output member and the roller.

19. The method according to claim 18, wherein the frame includes a structural member defining a recess, and wherein the act of mounting the motor to the frame is carried out by mounting the motor to the structural member such that the motor is entirely received within the recess.

* * * * *